United States Patent
Lacher et al.

(10) Patent No.: US 10,104,826 B2
(45) Date of Patent: Oct. 23, 2018

(54) SYSTEM FOR CONTROLLING THE SUPPLY OF HYDRAULIC FLUID TO A WORK VEHICLE IMPLEMENT

(71) Applicant: CNH Industrial America, LLC, New Holland, PA (US)

(72) Inventors: Jonathan Lacher, Fargo, ND (US); Michael Freisleban, Homer Glen, IL (US); Jerry L. Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 258 days.

(21) Appl. No.: 15/010,301

(22) Filed: Jan. 29, 2016

(65) Prior Publication Data

US 2017/0215329 A1      Aug. 3, 2017

(51) Int. Cl.
| | | |
|---|---|---|
| *F15B 13/04* | (2006.01) | |
| *A01B 63/32* | (2006.01) | |
| *F15B 11/08* | (2006.01) | |
| *F15B 13/043* | (2006.01) | |
| *A01B 63/00* | (2006.01) | |

(52) U.S. Cl.
CPC ............ *A01B 63/32* (2013.01); *A01B 63/008* (2013.01); *F15B 11/08* (2013.01); *F15B 13/0402* (2013.01); *F15B 13/0433* (2013.01)

(58) Field of Classification Search
CPC ................. F15B 13/026; F15B 11/166; F15B 2211/50554; F15B 2211/6355; A01B 63/32; A01B 63/008
See application file for complete search history.

(56) References Cited

U.S. PATENT DOCUMENTS

| | | | |
|---|---|---|---|
| 4,024,710 | A | 5/1977 | Zelle |
| 4,883,091 | A | 11/1989 | Weiler et al. |
| 5,988,770 | A | 11/1999 | Volz |
| 6,745,634 | B2 | 6/2004 | Beck et al. |
| 6,802,791 | B1 | 10/2004 | Yoshioka |
| 6,990,999 | B2 | 1/2006 | Patel |
| 8,056,465 | B2 | 11/2011 | Carlz |
| 8,202,197 | B2 | 6/2012 | Ogata et al. |
| 8,613,295 | B2 | 12/2013 | Huang |
| 8,800,600 | B2 | 8/2014 | Huang |
| 2015/0167276 | A1 | 6/2015 | Brinkley et al. |

*Primary Examiner* — Thomas E Lazo
*Assistant Examiner* — Daniel Collins
(74) *Attorney, Agent, or Firm* — Rickard K. DeMille; Rebecca L. Henkel

(57) ABSTRACT

In one aspect, a system for controlling the supply of hydraulic fluid to an implement may include a pump, a control valve coupled to the pump and first and second fluid lines provided in flow communication with output ports of the control valve. The system may also include a pressure control valve configured to regulate a pressure of the hydraulic fluid being supplied to the control valve such that the hydraulic fluid is supplied to the control valve at a first pressure for raising at least one ground-engaging component of the implement and a second pressure for lowering the ground-engaging component(s). Moreover, the system may include a bypass line in fluid communication with the pressure control valve such that fluid diverted through the bypass line actuates the pressure control valve to adjust the fluid pressure of the hydraulic fluid supplied to the control valve between the first and second pressures.

9 Claims, 4 Drawing Sheets

SYSTEM FOR CONTROLLING THE SUPPLY OF HYDRAULIC FLUID TO A WORK VEHICLE IMPLEMENT

FIELD OF THE INVENTION

The present subject matter relates generally to work vehicles and, more particularly, to a system for controlling the supply of hydraulic fluid to an implement of a work vehicle, particularly when the implement is configured to be operated in a constant down pressure mode.

BACKGROUND OF THE INVENTION

Work vehicles, such as tractors and other agricultural vehicles, include a hydraulic system configured to control the supply of hydraulic fluid to various on-board hydraulic components and/or various auxiliary hydraulic components, such as one or more hydraulic motors and/or cylinders included within an implement being towed by the vehicle. Conventional hydraulic systems utilize pressure-compensated flow control valve sections to modulate the flow of hydraulic fluid to the various auxiliary hydraulic components. In these conventional systems, a pump is configured to supply pressurized fluid to a flow control valve that regulates the flow of hydraulic fluid to a given hydraulic component. The load sensed at the flow control valve is then used to adjust the output pressure of the pump.

Such conventional hydraulic systems are capable of operating quite efficiently when supplying hydraulic fluid to auxiliary hydraulic components that do not require pressure control. However, when supplying hydraulic fluid to auxiliary hydraulic components that do require pressure control, conventional hydraulic systems have certain disadvantages. For example, many implements, such as planters and seeders, include a pressure regulating valve for adjusting the pressure of the hydraulic fluid supplied to the implement from the vehicle's hydraulic system to allow the implement to be operated in a constant down pressure mode. Such pressure control on the implement often results in the vehicle's hydraulic system not operating properly. Specifically, since the pump is operated based on the load sensed at the flow control valve, the vehicle's hydraulic system is unable to adapt to the downstream pressure control. This leads to the pump being operated at a significantly reduced efficiency and also leads to excessive heat generation. For example, since the flow control valve in a conventional hydraulic system is configured to provide a constant flow rate, the pump is often driven up to its maximum pressure output in an attempt to maintain such flow rate in instances when the auxiliary hydraulic component(s) requires a lesser flow rate due to the downstream pressure control.

Accordingly, an improved system for controlling the supply of hydraulic fluid to an implement of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the supply of hydraulic fluid to an implement of a work vehicle, wherein the implement includes a hydraulic cylinder having a first chamber and a second chamber. The system may include a pump configured to provide hydraulic fluid under pressure through a pump output line and a control valve in flow communication with the pump. The control valve may be configured to regulate a supply of hydraulic fluid to the hydraulic cylinder. The system may also include first and second fluid lines provided in flow communication with first and second output ports, respectively, of the control valve. The control valve may be configured to supply hydraulic fluid through the first fluid line to the first chamber of the hydraulic cylinder for raising at least one ground-engaging component of the implement relative to the ground and may be configured to supply hydraulic fluid through the second fluid line to the second chamber of the hydraulic cylinder for lowering the ground-engaging component(s) relative to the ground. Additionally, the system may include a pressure control valve fluidly coupled to the pump output line. The pressure control valve may be configured to regulate a fluid pressure of the hydraulic fluid being supplied to the control valve such that the hydraulic fluid is supplied to the control valve at a first pressure for raising the ground-engaging component(s) and a second pressure for lowering the ground-engaging component(s). Moreover, the system may include a bypass line configured to be in fluid communication with the pressure control valve, wherein a portion of the hydraulic fluid supplied through the system is diverted through the bypass line so as to actuate the pressure control valve in a manner that adjusts the fluid pressure of the hydraulic fluid supplied to the control valve between the first and second pressures.

In another aspect, the present subject matter is directed to a system for controlling the supply of hydraulic fluid to an implement of a work vehicle, wherein the implement includes a hydraulic cylinder having a first chamber and a second chamber. The system may include a pump configured to provide hydraulic fluid under pressure through a pump output line and a control valve in flow communication with the pump. The control valve may be configured to regulate a supply of hydraulic fluid to the hydraulic cylinder. The control valve may include a valve spool extending between a first end having a first valve actuator associated therewith and a second end having a second valve actuator associated therewith. The valve spool may be movable to a neutral position, a raise position and a lower position. The system may also include first and second fluid lines provided in flow communication with first and second output ports, respectively, of the control valve. The valve spool may be configured to be actuated to the raise position to allow the control valve to supply hydraulic fluid through the first fluid line to the first chamber of the hydraulic cylinder for raising at least one ground-engaging component of the implement relative to the ground and may be configured to be actuated to the lower position to allow the control valve to supply hydraulic fluid through the second fluid line to the second chamber of the hydraulic cylinder for lowering the ground-engaging component(s) relative to the ground. Additionally, the system may include a pressure control valve configured to regulate a pilot pressure of the hydraulic fluid supplied to the first valve actuator to control a first pressure-based force applied against the first end of the valve spool and a secondary valve actuator provided in operative association with the second end of the valve spool. The secondary valve actuator may be configured to be selectively fluidly coupled to the second fluid line at a location downstream of the control valve. When hydraulic fluid is supplied to the secondary valve actuator from the second fluid line, the secondary valve actuator is configured to apply a second pressure-based force against the second end of the valve spool based on an output pressure of the hydraulic fluid supplied through the second fluid line from the control valve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
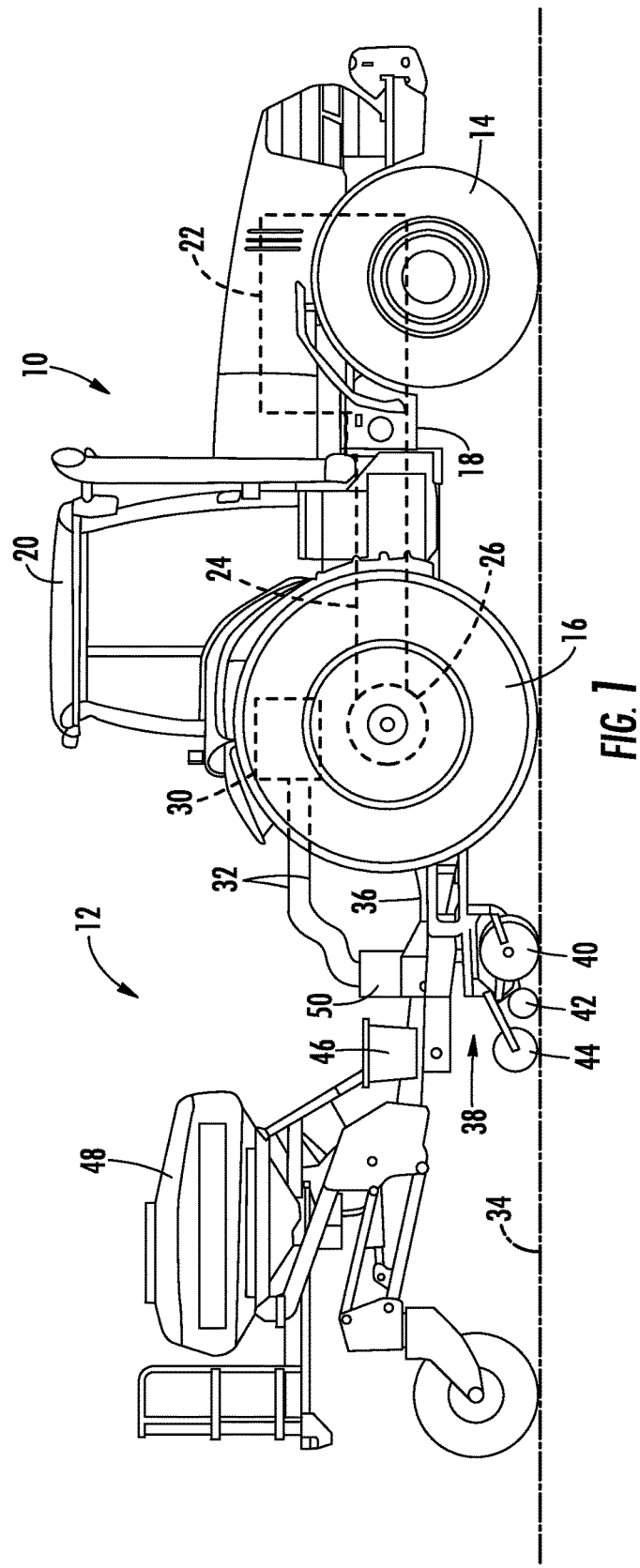
FIG. 1 illustrates a side view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved system for controlling the supply of hydraulic fluid to a work vehicle implement. Specifically, in several embodiments, the system may be configured to allow for an implement to be operated within a constant down pressure mode while avoiding the system inefficiencies and excessive heat generation typically experienced by conventional hydraulic systems. For example, as will be described below, the system may, in one embodiment, include a pressure control valve located upstream of the system's flow control valve for regulating the pressure of the hydraulic fluid being supplied to the flow control valve from the pump. In such an embodiment, the upstream pressure control valve may eliminate the need for pressure control devices to be located downstream of the control valve on the implement, such as the implement-side pressure regulating valve typically used to adjust the pressure of the hydraulic fluid supplied to the implement from the vehicle's hydraulic system. In addition, the upstream pressure control may allow for the system efficiency to be significantly improved.

Moreover, when using the upstream pressure control valve, the system may also include additional components and/or fluid lines to allow the output pressure of the pressure control valve to be hydraulically adjusted to accommodate differing system pressure requirements. For example, when lowering the implement relative to the ground and/or when operating the system within its constant down pressure mode, it may be desirable for the pressure control valve to provide hydraulic fluid to the control valve an given output pressure (e.g., at an operator-selected pressure setting). However, when raising the implement relative to the ground, it may be desirable for the pressure control valve to provide hydraulic fluid to the control valve a higher output pressure (e.g., at the maximum output pressure of the system pump).

In another embodiment of the present subject matter, the disclosed system may include a modified control valve configuration that allows the system to be operated in its constant down pressure mode by providing an auxiliary or secondary valve actuator in operative associated with the control valve that is configured to adjust the position of the valve's spool based on the output pressure of the control valve. Specifically, when operating in the constant down pressure mode, a portion of the hydraulic fluid being supplied to the implement from the control valve may be diverted to the secondary valve actuator such that a pressure-based force is applied to one end of the valve spool that is directly dependent on the output pressure of the control valve. In such an embodiment, by controlling the pressure-based force being applied to the opposed end of the valve spool, the opposed forces being applied against the valve spool may be balanced, thereby allowing the control valve to maintain its output pressure substantially constant.

Referring now to the drawings, FIG. 1 illustrates a side view of one embodiment of a work vehicle 10 towing an implement 12 in accordance with aspects of the present subject matter. As shown, the work vehicle 10 is configured as an agricultural tractor. However, in other embodiments, the work vehicle 10 may be configured as any other suitable work vehicle known in the art that is configured to tow an implement, such as various other agricultural vehicles and/or the like.

As shown in FIG. 1, the work vehicle 10 includes a pair of front wheels 14, a pair or rear wheels 16 and a chassis 18 coupled to and supported by the wheels 14, 16. An operator's cab 20 may be supported by a portion of the chassis 18 and may house various control devices (e.g., levers, pedals, control panels and/or the like) for permitting an operator to control the operation of the work vehicle 10 and/or the implement 12. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train of the work vehicle 10.

The work vehicle 10 may also include one or more auxiliary systems coupled to the engine 22. For example, as shown in FIG. 1, the work vehicle 10 may include a vehicle hydraulic system 30 that serves to provide a source of pressurized hydraulic fluid for powering various hydraulic components (e.g., actuators, motors, etc.) used for controlling the operation of the implement 12 and/or other detachable equipment. In several embodiments, the hydraulic system 30 may include one or more valves or valve blocks for controlling the flow of hydraulic fluid supplied to the implement 12 (e.g., via hydraulic lines 32).

As shown in FIG. 1, the implement 12 corresponds to a planter configured to be towed behind the work vehicle 10 across the ground 34. In several embodiments, the implement 12 may include a frame 36 and a plurality of planter units 38 coupled to and supported by the frame 36. As is generally understood, the planter units 38 may be configured to deposit seeds and/or fertilizer at a desired depth beneath the soil surface, thereby establishing rows of planted seeds. As such, each planter unit 38 may include one or more ground-engaging tools or components configured to engage or otherwise contact the ground 34. For example, in one embodiment, each planter unit 38 may include a pair of laterally spaced opener discs 40, a pair of laterally spaced furrow closer discs 42 and a press wheel 44. Seeds, fertilizer and/or other agricultural material may be supplied to each planter unit 38 via an individual hopper 46 and/or a bulk-fill hopper 48.

Additionally, the implement 12 may include an implement hydraulic system 50 configured to receive hydraulic fluid from the vehicle hydraulic system 30 (e.g., via lines 32) and supply such fluid to any number of hydraulic components associated with the implement 12. For example, in one embodiment, the implement 12 may include a plurality of hydraulic cylinders configured to raise and lower one or more of the ground-engaging components of the planter units 38 relative to the ground 34. In such instance, the hydraulic fluid received from the vehicle hydraulic system 30 may be distributed to the various cylinders via the implement hydraulic system 50. In addition, the implement 12 may include various other hydraulic components configured to receive hydraulic fluid, such as one or more hydraulic motors that may be used to drive a fan and/or seed drive of the implement 12 and/or that may be used to adjust the implement 12 to a transport configuration (e.g., by folding in wing sections of the frame 36).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of tires.

It should also be appreciated that the configuration of the implement 12 described above and shown in FIG. 1 is only provided for exemplary purposes. Thus, it should be appreciated that the present subject matter may be readily adaptable to any manner of implement configuration. Specifically, the implement 12 may generally correspond to any suitable type of implement that is configured to receive hydraulic fluid from the work vehicle 10 in order to operate one or more hydraulic components associated with the implement 12. As will be described below, the disclosed system may be particularly advantageous for use with implements including hydraulic components that require some form of pressure control, such as planters, seeders and/or other suitable hydraulics-equipped implements that are configured to operate in a constant or automatic down pressure mode.

Figure 2:
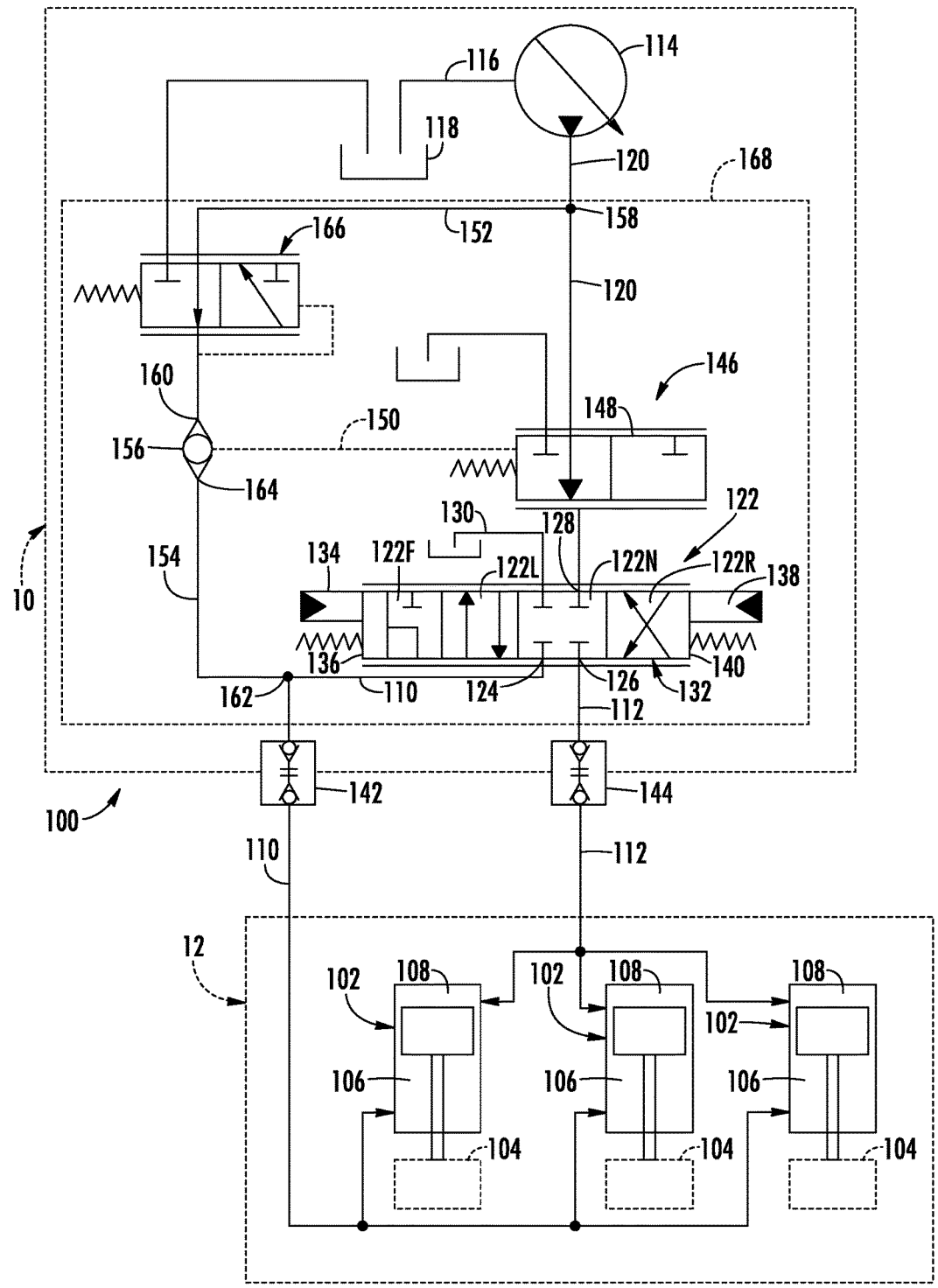
FIG. 2 illustrates a simplified, schematic view of one embodiment of a system for controlling the supply of hydraulic fluid to a work vehicle implement in accordance with aspects of the present subject matter.

Referring now to FIG. 2, a schematic view of one embodiment of a system 100 for controlling the supply of hydraulic fluid to a work vehicle implement is illustrated in accordance with aspects of the present subject matter. In general, the system 100 will be described herein with reference to the work vehicle 10 and the implement 12 described above with reference to FIG. 1. However, it should be appreciated that, in general, the system 100 may be utilized with any suitable work vehicles and/or implements.

As shown in FIG. 2, the system 100 may include a plurality of hydraulic cylinders 102 located on the implement 12. In several embodiments, the hydraulic cylinders 102 may be used to raise and lower one or more ground-engaging components (indicated by dashed boxes 104 in FIG. 2) of the implement 12 relative to the ground, such as the opener discs 40, closer discs 42 and/or press wheel 44 described above. As shown in the illustrated embodiment, each cylinder 102 may include a rod-side or first chamber 106 and a piston-side or second chamber 108, with the first chamber 106 being fluidly coupled to a first fluid line 110 of the system 100 and the second chamber 108 being fluidly coupled to a second fluid line 112 of the system 100. As will be described below, hydraulic fluid may be supplied to the first chamber 106 of each cylinder 102 via the first fluid line 110 to allow the ground engaging component(s) 104 of the implement 12 to be raised relative to the ground. Similarly, hydraulic fluid may be supplied to the second chamber 108 of each cylinder 102 via the second fluid line 112 to allow the ground-engaging component(s) 104 to be lowered relative to the ground. Moreover, in accordance with aspects of the present subject matter, when the system 100 is operating in a constant down pressure mode, the pressure of the hydraulic fluid supplied to the second chamber 108 of each cylinder 102 may be maintained substantially constant to allow the ground-engaging component(s) 104 to apply a substantially constant down pressure against the ground or furrow.

Moreover, as shown in FIG. 2, the system 100 may include a pump 114 located on the work vehicle 10 that is configured to receive hydraulic fluid via a pump input line 116 from a fluid source (e.g., tank 118) and pressurize such fluid for output via a pump output line 120 to one more system components. For example, as shown in the illustrated embodiment, the system may include a control valve 122 provided in flow communication with the pump output line 120. In several embodiments, the control valve 122 configured to selectively regulate the supply of hydraulic fluid flowing between the pump 114 and the first and second fluid lines 110, 112. For example, as shown in FIG. 2, a first output port 124 of the control valve 122 may be provided in flow communication with the first fluid line 110 and a second output port 126 of the control valve 122 may be provided in flow communication with the second fluid line 112.

It should be appreciated that the control valve 122 may be actuatable or movable to a plurality of different valve positions. For example, the control valve 122 may be moved to a neutral position (indicated by box 122N) at which the supply of hydraulic fluid through the control valve 122 is cut-off. Additionally, the control valve 122 may be actuated to both a raise position (indicated by box 122R) and a lower position (indicated by box 122L). When at the raise position 122R, hydraulic fluid received at an inlet port 128 of the control valve 122 may be directed through the control valve 122 to the first fluid line 110 via the first output port 124 to pressurize the first chamber 106 of each cylinder 102, thereby allowing the ground-engaging component(s) 104 to be raised relative to the ground. Similarly, at the lower position 122L, hydraulic fluid received at the inlet port 128 of the control valve 122 may be directed through the control valve 122 to the second fluid line 112 via the second output port 126 to pressurize the second chamber 108 of each cylinder 102, thereby allowing the ground-engaging component(s) 103 to be lowered relative to the ground. Moreover, as shown in FIG. 2, the control valve 122 may also be actuatable to a float position (indicated by box 122F) to allow fluid within the first and second fluid lines 110, 112 to be returned via a suitable return line 130.

It should also be appreciated that the control valve 122 may have any suitable valve configuration that allows it to function as described herein. For instance, as shown in the illustrated embodiment, the control valve 122 may correspond to a spring-centered, hydraulic pilot-operated directional control valve. As such, the control valve 122 may include a valve spool 132 configured to be hydraulically actuated between the various different valve positions. For example, the control valve 122 may be configured to normally be in the neutral position 122N. In such an embodiment, to adjust the control valve 122 to the lower position 122L or the float position 122F, hydraulic fluid may be supplied to a first valve actuator 134 operatively associated with a first end 136 of the valve spool 132 so as to actuate the control valve 122 to the lower position 122L or the float position 122F. Similarly, to adjust the control valve 122 to the raise position 122R, hydraulic fluid may be supplied to a second valve actuator 138 operatively associated with a second end 140 of the valve spool 132 so as to actuate the control valve 122 to the raise position 122R.

As used herein, the term "first fluid line" generally refers to the flow path defined between the first outlet port 124 of the control valve 122 and the first chamber 106 of each cylinder 102. Thus, it should be appreciated that the first fluid line 110 may be formed from a single fluid conduit or multiple fluid conduits coupled to one another to form the desired fluid path. For instance, as shown in FIG. 2, a first quick connect coupler 142 may be provided to allow separate portions of the first fluid line 110 to be coupled together to form a continuous flow path.

Similarly, as used herein, the term "second fluid line" generally refers to the flow path defined between the second outlet port 126 of the control valve 122 and the second chamber 108 of each cylinder 102. Thus, it should be appreciated that the second fluid line 112 may be formed from a single fluid conduit or multiple fluid conduits coupled to one another to form the desired fluid path. For instance, as shown in FIG. 2, a second quick connect coupler 144 may be provided to allow separate portions of the second fluid line 110 to be coupled together to form a continuous flow path.

Additionally, as shown in FIG. 2, the system 100 may include a pressure control valve 116 (also referred to herein as the primary pressure control valve 116) fluidly coupled between the pump 114 and the control valve 122 to allow the pressure control valve 116 to regulate the pressure of the hydraulic fluid being supplied to the control valve 122 from the pump 114. Specifically, as shown in the illustrated embodiment, the pressure control valve 146 may be provided in fluid communication the output line 120 of the pump 114 such that hydraulic fluid from the pump 114 is directed through the pressure control valve 146. The hydraulic fluid transferred through the pressure control valve 146 may then be directed to the inlet port 128 of the control valve 122.

In several embodiments, the pressure control valve 146 may correspond to an adjustable pressure regulating valve configured to regulate the pressure of the hydraulic fluid supplied to the control valve 122. Specifically, when the control valve 122 is moved to the raised position 122R, the pressure control valve 146 may be configured to adjust the output pressure of the hydraulic fluid being supplied to the control valve 122 to a suitable "raising" pressure for raising the ground-engaging component(s) 104 relative to the ground (e.g., a maximum output pressure of the pump 114). Similarly, when the control valve 122 is moved to the lower position 122L, the pressure control valve 146 may be configured to adjust the output pressure of the hydraulic fluid being supplied to the control valve 122 to a suitable "lowering" pressure for lowering the ground-engaging component(s) 104 relative to the ground. Such "lowering" pressure may, in certain embodiments of the present subject matter, correspond to an operator-selected pressure setting to be applied when the system 100 is being operated in its constant down pressure mode. As such, when the system 100 is switched to such operating mode, the pressure control valve 146 may be configured to maintain its output pressure substantially constant at the operator-selected pressure setting to allow the desired down pressure to be applied against the ground or farrow by the ground-engaging component(s) 104.

It should be appreciated that, as used herein, the pressure of the hydraulic fluid supplied to the second chamber 108 of each cylinder 102 is maintained "substantially constant" over a given period of time when the fluid pressure of the hydraulic fluid supplied to the second chamber 108 varies across such time period by less than +/−10%, such as less than +/−5%, or less than +/−2% or less +/−1%.

It should also be appreciated that the pressure control valve 146 may be configured to be actuated in any suitable manner that allows the valve 146 to regulate the pressure of the hydraulic fluid supplied to the control valve 122. For instance, as will be described below, the pressure control valve 146 may include a valve spool 148 configured to be hydraulically actuated so as to adjust the output pressure of the pressure control valve 146. In such embodiments, a pilot line 150 may be provided in flow communication with the pressure control valve 146 to allow the valve spool 148 to be hydraulically actuated in a manner that adjusts the output pressure of the valve, for example, between the desired "raising" and "lowering" pressures.

Additionally, in several embodiments of the present subject matter, the system 100 may include first and second bypass lines 152, 154 provided in flow communication with a shuttle valve 156 configured to selectively regulate the flow of hydraulic fluid supplied through the pilot line 150 from the first and second bypass lines 152, 154, respectively, for adjusting the output pressure of the pressure control valve 146. As shown, the first bypass line 152 may extend between a first end 158 fluidly coupled to the pump output line 120 at a location upstream of the pressure control valve 146 and a second end 160 terminating at the shuttle valve 156. Similarly, the second bypass line 154 may extend between a first end 162 fluidly coupled to the first fluid line 110 at a location downstream of the control valve 122 and a second end 164 terminating at the shuttle valve 156. Moreover, as shown in FIG. 2, the pilot line 150 may be fluidly coupled between the shuttle valve 156 and the pressure control valve 146. As such, when the fluid pressure of the hydraulic fluid supplied through the first bypass line 152 is greater than the fluid pressure of the hydraulic fluid supplied through the second bypass line 154, the shuttle valve 150 may be configured to provide a flow path between the first bypass line 152 and the pilot line 150 to allow the fluid pressure of the hydraulic fluid supplied through the first bypass line 152 to be used to actuate the pressure control valve 146. Similarly, when the fluid pressure of the hydraulic fluid supplied through the first bypass line 152 is less than the fluid pressure of the hydraulic fluid supplied through the second bypass line 154, the shuttle valve 156 may be configured to provide a flow path between the second bypass line 154 and the pilot line 150 to allow the fluid pressure of the hydraulic fluid supplied through the second bypass line 154 to be used to actuate the pressure control valve 146.

As shown in FIG. 2, the system 100 may also include a secondary pressure control valve 166 provided in flow communication with the first bypass line 152. In general, the secondary pressure control valve 166 may be configured to regulate the pressure of the hydraulic fluid being supplied to the shuttle valve 156 via the first bypass line 152. As such, when the fluid pressure of the hydraulic fluid supplied through the first bypass line 152 is greater than the fluid pressure of the hydraulic fluid supplied through the second bypass line 154, the actuation of the primary pressure control valve 146 may be controlled directly based on the output pressure of the secondary pressure control valve 166. For example, as will be described below, the output pressure for the secondary pressure control valve 166 may be selected based on an operator-selected pressure setting for operating the system 100 within its constant down pressure mode. In such an embodiment, the output pressure for the secondary pressure control valve 166 may correspond to a pressure value sufficient to actuate the valve spool 148 of the primary pressure control valve 146 in a manner such that the output pressure of the primary pressure control valve 146 is equal to the operator-selected pressure setting. For instance, as shown in the illustrated embodiment, the primary pressure control valve 146 may correspond to a spring-biased, normally open pressure regulating valve. Thus, to adjust the output pressure of the primary pressure control valve 146 to the operator-selected pressure setting, the output pressure for the secondary pressure control valve 166 may correspond to the operator-selected pressure setting less the known pressure value applied against the valve spool 148 via the valve spring.

It should be appreciated that, in several embodiments, the secondary pressure control valve 166 may correspond to an electronically controlled pressure regulating valve. As such, a suitable computing device or controller may be used to electronically regulate the operation of the secondary pressure control valve 166, thereby allowing for automatic control of the output pressure of such valve 166. For instance, the computing device or controller may receive a suitable input associated with the operator-selected pressure setting to be applied when operating the system 100 within its constant down pressure mode. Thereafter, the computing device or controller may, when appropriate, electronically control the operation of the secondary pressure control valve 166 such that the resulting output pressure of the primary pressure control valve 146 corresponds to the operator-selected pressure setting.

During operation of the system 100, the control valve 122 may be actuated between its various different valve positions to allow the ground-engaging component(s) 104 of the implement 12 to be raised and lowered as well as to allow the implement 12 to be operated in its constant down pressure mode. For example, the control valve 122 may be moved to the lower position 122L to allow the ground-engaging component(s) 104 to be lowered relative to the ground. Specifically, at the lower position 122L, hydraulic fluid supplied to the control valve 122 from the primary pressure control valve 146 may be output from the control valve 122 via the second output port 126 and directed through the second fluid line 112 to the second chamber 108 of each cylinder 102, thereby allowing the ground-engaging component(s) 104 to be lowered relative to the ground. Additionally, when the control valve 122 is at the lower position 136L, hydraulic fluid contained within the first chamber 106 of each cylinder 102 may be directed back through the control valve 122 from the first fluid line 110 to allow such fluid to be returned via the return line 130.

As indicated above, when lowering the ground engaging component(s) 104, the "lowering" pressure of the hydraulic fluid output from the primary pressure control valve 146 may, in several embodiments, be set to an operator-selected pressure setting corresponding to the pressure value at which the operator desires for the system 100 to maintain during operation within the constant down pressure mode. To achieve this operator-selected pressure setting, the output pressure of the secondary pressure control valve 166 may be set to the appropriate pressure value for adjusting the positioning of the valve spool 148 of the primary pressure control valve 146 to the suitable valve position for maintaining the output pressure of the primary pressure control valve 146 at the operator-selected pressure setting. Given the significantly low fluid pressure within the second bypass line 154 when the control valve 122 is moved to its lower position 122L, the higher fluid pressure within the first bypass line 152 may be sufficient to actuate the shuttle valve 156 to provide a direct flow path between the first bypass line 152 and the pilot line 150, thereby allowing the output pressure of the primary pressure control valve 146 to be adjusted based on the output pressure of the hydraulic fluid supplied from the secondary pressure control valve 166.

Similarly, when raising the ground-engaging component(s) 104 of the implement 12, the control valve 122 may be moved to its raise position 122R. Specifically, at the raise position 122R, hydraulic fluid supplied to the control valve 122 from the primary pressure control valve 146 may be output from the control valve 122 via the first output port 124 and directed through the first fluid line 110 to the first chamber 106 of each cylinder 102, thereby allowing the ground-engaging component(s) 104 to be raised relative to the ground. In addition, when the control valve 122 is at the raise position 122R, hydraulic fluid contained within the second chamber 108 of each cylinder 102 may be directed back through the control valve 122 from the second fluid line 112 to allow such fluid to be returned via the return line 130.

Additionally, by supplying hydraulic fluid from the control valve 122 through the first fluid line 110, a portion of the hydraulic fluid may be diverted through the second bypass line 154 to the shuttle valve 156. The pressure of the hydraulic fluid diverted through the second bypass line 154 may generally correspond to the output pressure of the primary pressure control valve 146. Thus, when the control valve 122 is initially moved to the raise position 122R from the lower position 122L, the pressure of the hydraulic fluid diverted through the second bypass line 146 may generally be equal to the operator-selected pressure setting. As a result, given the configuration of the primary pressure control valve 146 (e.g., the spring-biased, normally open configuration), the pressure of the hydraulic fluid initially diverted through the second bypass line 154 will be greater than the pressure of the hydraulic fluid being supplied through the first bypass line 142. Accordingly, the shuttle valve 156 may be actuated to provide a direct flow path between the second bypass line 154 and the pilot line 150, thereby allowing the output pressure of the primary pressure control valve 146 to be increased based on the fluid pressure of the hydraulic fluid supplied through the second bypass line 154. As the output pressure of the primary pressure control valve 146 is increased, the pressure-based force applied against the valve spool 148 of the primary pressure control valve 146 may be continuously increased until a maximum output pressure is obtained.

It should be appreciated that, for purposes of describing the present subject matter, the various valves 122, 146, 166 have been described herein as individual components. However, in other embodiments, such valves 122, 146, 166 and their corresponding fluid lines may be incorporated into a common valve block or casing positioned on the work vehicle 10. For example, as shown in FIG. 2, the valves 122, 146, 166 may all be integrated into or otherwise incorporated within the same valve block (e.g., indicated by dashed line 168).

Figure 3:
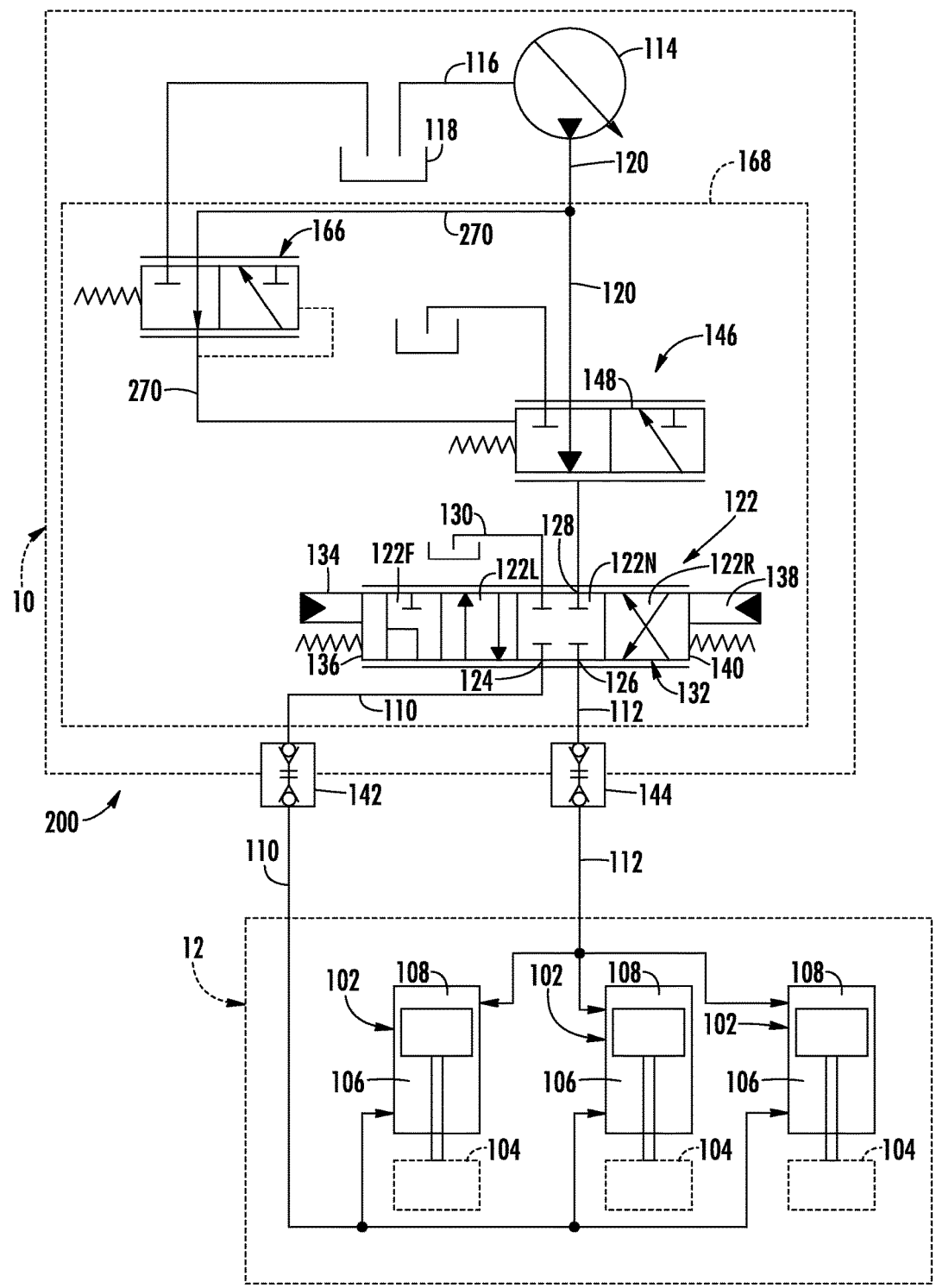
FIG. 3 illustrates a simplified, schematic view of another embodiment of a system for controlling the supply of hydraulic fluid to a work vehicle implement, particularly illustrating a variation of the embodiment of the system shown in FIG. 2.

Referring now to FIG. 3, a simplified, schematic view of another embodiment of a system 200 for controlling the supply of hydraulic fluid to a work vehicle implement is illustrated in accordance with aspects of the present subject matter, particularly illustrating a variation of the embodiment of the system 100 described above. In general, the system 200 may be configured similarly to the system 100 described above with reference to FIG. 2 and, thus, may include all or a significant portion of the components and fluid lines described above. For example, as shown in FIG. 3, the system 200 may include a pump 114, a control valve 122, a primary pressure control valve 146 and a secondary pressure control valve 166. Additionally, the system 200 may include a first fluid line 110 extending between the control valve 122 and a first chamber 106 of each hydraulic cylinder 102 and a second fluid line 112 extending between the control valve 122 and a second chamber 108 of each hydraulic cylinder 102.

However, unlike the embodiment shown in FIG. 2, the system 200 includes a single bypass line 270 defining a flow path for directing hydraulic fluid to the primary pressure control valve 146 so as to adjust the output pressure of such valve 146. In general, the bypass line 270 may encompass or form the same flow path defined by the first bypass line 152 and the pilot line 150 described above with reference to FIG. 2. For example, as shown in FIG. 3, the bypass line 270 may be fluidly coupled to the pump output line 120 at a location upstream of the primary pressure control valve 146 such that a portion of the hydraulic fluid flowing through the pump output line 120 is diverted through the bypass line 270 and is directed to the primary pressure control valve 146 as a pilot flow. Additionally, as shown in FIG. 3, the secondary pressure control valve 166 may be provided in flow communication with the bypass line 27-. In such an embodiment, the secondary pressure control valve 166 may be used to regulate the pressure of the fluid being supplied through the bypass line 270, thereby providing a means for adjusting the output pressure of the primary pressure control valve 146. For example, when the control valve 122 is moved to the lower position 122L, the operation of the secondary pressure control valve 166 may be actively controlled such that the fluid pressure of the hydraulic fluid supplied through the bypass line 270 serves to adjust the valve spool 148 associated with the primary pressure control valve 146 to a suitable valve position for maintaining the output pressure of the primary pressure control valve 146 at a desired "lowering" pressure for the system 200 (e.g., the operator-selected pressure setting). Similarly, when the control valve 122 is moved from the lower position 122L to the raise position 122R, the operation of the secondary pressure control valve 166 may be actively controlled such that the fluid pressure of the hydraulic fluid supplied through the bypass line 270 serves to adjust the valve spool 148 to a suitable valve position for maintaining the output pressure of the primary pressure control valve 146 at a desired "raising" pressure for the system 200 (e.g., at a pressure higher than the "lowering" pressure).

It should be appreciated that the various components and fluid lines shown in FIG. 3 may generally be configured to perform the same or a similar function to the corresponding components and fluid lines described above with reference to FIG. 2. For instance, the pump 114 may be configured to receive hydraulic fluid via a pump input line 116 from a fluid source (e.g., tank 118) and pressurize such fluid for output via the pump output line 120 to the control valve 122 (e.g., via the primary pressure control valve 146). Similarly, the control valve 122 may be configured to selectively regulate the supply of hydraulic fluid flowing through the first and second fluid lines 110, 112 to the first and second chambers 106, 108, respectively, of each hydraulic cylinder 102 (e.g., by adjusting the position of the valve 122 between its raise position 122R and its lower position 122L). For example, when at the raise position 122R, the control valve 122 may provide a flow path between the pump 114 and the first fluid line 110 for directing fluid to the first chamber 106 of each hydraulic cylinder 102, thereby allowing the ground-engaging component(s) 104 of the implement 12 to be raised relative to the ground. In such instance, the pressure of the fluid supplied to the control valve 122 from the primary pressure control valve 146 may, as indicated above, be regulated by controlling the pressure of the fluid directed through the bypass line 270 (e.g., via control of the operation of the secondary pressure control valve 166). Similarly, when at the lower position 122L, the control valve 122 may provide a flow path between the pump 114 and the second fluid line 112 for directing fluid to the second chamber 108 of each hydraulic cylinder 102, thereby allowing the ground-engaging component(s) 104 to be lowered relative to the ground. Again, in such instance, the pressure of the fluid supplied to the control valve 122 from the primary pressure control valve 146 may be regulated by controlling the pressure of the fluid directed through the bypass line 270 (e.g., via control of the operation of the secondary pressure control valve 166).

Figure 4:
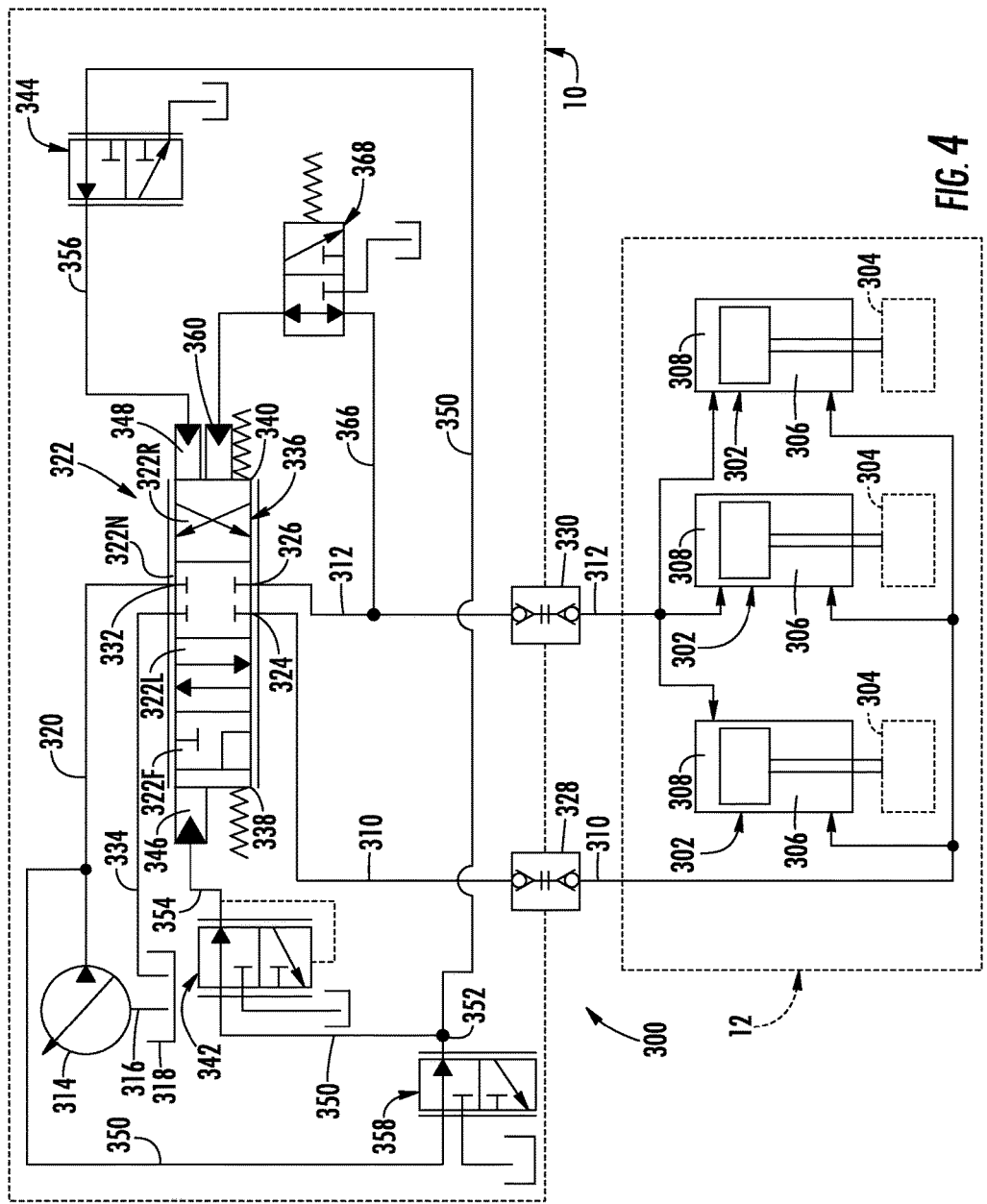
FIG. 4 illustrates a simplified, schematic view of a further embodiment of a system for controlling the supply of hydraulic fluid to a work vehicle implement in accordance with aspects of the present subject matter.

Referring now to FIG. 4, a schematic view of yet another embodiment of a system 300 for controlling the supply of hydraulic fluid to a work vehicle implement is illustrated in accordance with aspects of the present subject matter. In general, the system 300 will be described herein with reference to the work vehicle 10 and the implement 12 described above with reference to FIG. 1. However, it should be appreciated that, in general, the system 300 may be utilized with any suitable work vehicles and/or implements.

As shown in FIG. 4, the system 300 may include a plurality of hydraulic cylinders 302 located on the implement 12. In several embodiments, the hydraulic cylinders 302 may be used to raise and lower one or more ground-engaging components (indicated by dashed boxes 304 in FIG. 4) of the implement 12 relative to the ground, such as the opener discs 40, closer discs 42 and/or press wheel 44 described above. As shown in the illustrated embodiment, each cylinder 302 may include a rod-side or first chamber 306 and a piston-side or second chamber 308, with the first chamber 306 being fluidly coupled to a first fluid line 310 of the system 300 and the second chamber 308 being fluidly coupled to a second fluid line 312 of the system 300. As will be described below, hydraulic fluid may be supplied to the first chamber 306 of each cylinder 302 via the first fluid line 310 to allow the ground engaging component(s) 304 of the implement 12 to be raised relative to the ground. Similarly, hydraulic fluid may be supplied to the second chamber 308 of each cylinder 302 via the second fluid line 312 to allow the ground-engaging component(s) 304 to be lowered relative to the ground. Moreover, in accordance with aspects of the present subject matter, when the system 300 is operating in a constant down pressure mode, the pressure of the hydraulic fluid supplied to the second chamber 308 of each cylinder 102 may be maintained substantially constant to allow the ground-engaging component(s) 104 to apply a substantially constant down pressure against the ground or furrow.

Moreover, as shown in FIG. 4, the system 300 may include a pump 314 located on the work vehicle 10 that is configured to receive hydraulic fluid via a pump input line 316 from a fluid source (e.g., tank 318) and pressurize such fluid for output via a pump output line 320 to one more system components. As shown in the illustrated embodiment, the system 300 may also include a control valve 322 configured to selectively regulate the supply of hydraulic fluid flowing between the pump 314 and the first and second fluid lines 310, 312. For example, as shown in FIG. 4, a first output port 324 of the control valve 311 may be provided in flow communication with the first fluid line 310 and a second output port 326 of the control valve 322 may be provided in flow communication with the second fluid line 312.

It should be appreciated that the first and second fluid lines 310, 312 may generally be configured the same as or similar to the first and second fluid lines 110, 112 described above with reference to FIGS. 2 and 3. For instance, the first fluid line 310 may generally define the flow path between the first outlet port 324 of the control valve 322 and the first chamber 306 of each cylinder 302. As such, the first fluid line 310 may be formed from a single fluid conduit or multiple fluid conduits coupled to one another to form the desired fluid path. For instance, as shown in FIG. 4, a first quick connect coupler 328 may be provided to allow separate portions of the first fluid line 310 to be coupled together to form a continuous flow path. Similarly, the second fluid line 312 may generally define the flow path between the second outlet port 326 of the control valve 122 and the second chamber 308 of each cylinder 302. Thus, the second fluid line 312 may be formed from a single fluid conduit or multiple fluid conduits coupled to one another to form the desired fluid path. For instance, as shown in FIG. 4, a second quick connect coupler 330 may be provided to allow separate portions of the second fluid line 310 to be coupled together to form a continuous flow path.

In several embodiments, the control valve 322 may be actuatable or movable to a plurality of different valve positions. For example, the control valve 322 may be moved to a neutral position (indicated by box 322N) at which the supply of hydraulic fluid through the control valve 322 is cut-off. Additionally, the control valve may be actuated to both a raise position (indicated by box 322R) and a lower position (indicated by box 322L). When at the raise position 322R, hydraulic fluid received at an inlet port 332 of the control valve 322 may be directed through the control valve 322 to the first fluid line 310 via the first output port 324 to pressurize the first chamber 306 of each cylinder 302, thereby allowing the ground-engaging component(s) 304 to be raised relative to the ground. Similarly, at the lower position 322L, hydraulic fluid received at the inlet port 332 may be directed through the control valve 322 to the second fluid line 312 via the second output port 326 to pressurize the second chamber 308 of each cylinder 302, thereby allowing the ground-engaging component(s) 304 to be lowered relative to the ground. Moreover, as shown in FIG. 4, the control valve 322 may also be actuated to a float position (indicated by box 322F) to allow fluid within the first and second fluid lines 310, 312 to be returned via a suitable return line 334.

It should be appreciated that the control valve 322 may have any suitable valve configuration that allows it to function as described herein. For instance, as shown in the illustrated embodiment, the control valve 322 may correspond to a spring-centered, hydraulic pilot-operated directional control valve. As such, the control valve 322 may include a valve spool 336 configured to be hydraulically actuated between the various different valve positions. For example, the control valve 322 may be configured to normally be in the neutral position. Thus, to adjust the control valve 322 to the lower position 322L or the float position 322F, a suitable pressure-based force may be applied to a first end 338 of the valve spool 336 to cause the valve spool 336 to shift in a first direction (e.g., to the right in FIG. 4), thereby allowing the control valve 322 to be actuated to the lower position 322L or the float position 322F. Similarly, to adjust the control valve 322 to the raise position 322R, a suitable pressure-based force may be applied to a second end 340 of the valve spool 336 to cause the valve spool 336 to shift in a second, opposite direction (e.g., to the left in FIG. 4), thereby allowing the control valve 322 to be actuated to the raise position 322R.

Referring still to FIG. 4, the system 300 may also include first and second pressure control valves 342, 344 configured to regulate the pressure of hydraulic fluid being supplied to first and second valve actuators 346, 348 provided in operative association with the first and second ends 338, 340, respectively, of the valve spool 336. Specifically, each of the pressure control valve 342, 344 may be provided in flow communication with the pump 314 via a pilot supply line 350 fluidly coupled to the pump output line 320 at a location upstream of the control valve 322. As shown in FIG. 4, the pilot supply line 350 may split into two separate supply lines (e.g., at location 352) to allow a portion of the hydraulic fluid supplied by the pump 314 to be diverted through each of the pressure control valves 342, 344. The hydraulic fluid output from the first pressure control valve 342 may then be supplied to the first valve actuator 346 (via a first pilot line 354) while the hydraulic fluid output from the second pressure control valve 344 may be supplied to the second valve actuator 348 (via a first pilot line 356). Additionally, as shown in the illustrated embodiment, the system 300 may also include an auxiliary pressure control valve 358 provided in flow communication with the pilot supply line 350 upstream of the split location 352. As such, the auxiliary pressure control valve 358 may be configured to adjust the pressure of the hydraulic fluid being supplied through the pilot supply line 350 to each of the pressure control valves 342, 344.

By regulating the pressure of the hydraulic fluid supplied to each of the valve actuators 346, 348, the first and second pressure control valves 342, 344 may allow for the movement of the valve spool 336 to be accurately controlled. For example, when the output pressure of the first pressure control valve 342 is increased, the first valve actuator 346 may be configured to apply a pressure-based force against the first end 338 of valve spool 336 that pushes the valve spool 336 in the direction of the second valve actuator 348, thereby allowing the valve spool 336 to be moved to the lower position 322L (and, subsequently, the float position 322F). Similarly, when the output pressure of the second pressure control valve 344 is increased, the second valve actuator 348 may be configured to apply a pressure-based force against the second end 340 of valve spool 336 that pushes the valve spool 336 in the direction of the first valve actuator 346, thereby allowing the valve spool 336 to be moved to the raise position 322R.

Moreover, in accordance with aspects of the present subject matter, the system 300 may also include a secondary valve actuator 360 provided in operative associated with either the first end 338 or the second end 340 of the valve spool 336. For example, as shown in FIG. 4, the secondary valve actuator 360 is coupled to the second end 340 of valve spool 336. In general, the secondary valve actuator 360 may correspond to any suitable hydraulic valve actuator known in the art. For example, in one embodiment, the secondary valve actuator 360 may correspond to a hydraulic piston and, thus, may include a piston rod (not shown) and a corresponding piston chamber (not shown). As such, when pressurized fluid is supplied to the piston chamber, the piston rod may be actuated outwardly and apply a pressure-based force against the second end 340 of the valve spool 335.

As shown in FIG. 4, the secondary valve actuator 360 may be configured to be fluidly coupled to the second fluid line 312 via a suitable fluid bypass line 366. Additionally, a shut-off valve 368 may be positioned along the bypass line 366 for controlling the supply of hydraulic fluid to the secondary valve actuator 360. As such, the secondary valve actuator 360 may be configured to be selectively provided in flow communication with the second fluid line 312 depending on the operating mode of the system 300. Specifically, in several embodiments, the shut-off valve 368 may be configured to be moved to a closed position when the system 300 is being used to raise or lower the ground engaging component(s) 304, thereby cutting-off the supply of hydraulic fluid to the secondary valve actuator 360. In such instance, the actuation of the valve spool 336 may be controlled solely by regulating the pressure of the hydraulic fluid supplied to the first and second valve actuators 346, 348. However, when the system 300 is operating in its constant down pressure mode, the shut-off valve 368 may be configured to be moved to an open position to allow a portion of the hydraulic fluid flowing through the second fluid line 312 from the control valve 322 to be diverted to the secondary valve actuator 360. In such instance, as will be described below, the actuation of the valve spool 336 may be controlled based on a balancing of the pressure-based forces applied at the opposed ends 338, 340 of the valve spool 336 via the first and secondary valve actuators 246, 360.

In several embodiments, the balancing of the pressure-based forces applied at the opposed ends 338, 340 of the valve spool 336 may be achieved by understanding the relative dimensions and/or hydraulic parameters of the various valve actuators 346, 348, 360. For instance, by knowing the piston/surface areas associated with the first and secondary valve actuators 346, 360, an intensification ratio may be determined that defines the pressure relationship between the pressure-based force being applied at the first end 338 of the valve spool 336 by the first valve actuator 346 and the pressure-based force being applied to the second end 340 of the valve spool 336 by the secondary valve actuator 360. As such, since the pressure-based force applied by the secondary valve actuator 360 depends directly on the fluid pressure of the hydraulic fluid supplied through the second fluid line 312, the output pressure of the first pressure control valve 342 may be selected based on the intensification ratio and the desired fluid pressure within the second fluid line 312 such that, when the pressure of the hydraulic fluid flowing through the second fluid line 312 is equal or substantially equal to the desired fluid pressure, the pressure-based forces applied at the opposed ends 338, 340 of the valve spool 336 may be equal or substantially equal to one another. Such balancing of the pressure-based forces may result in the valve spool 336 being moved to its normal or neutral position, thereby allowing the downstream pressure within the second fluid line 312 to be maintained constant or substantially constant.

During operation of the system 300, the control valve 322 may be actuated between its various different valve positions to allow the ground-engaging component(s) 304 of the implement 312 to be raised and lowered as well as to allow the system 300 to be operated in its constant down pressure mode. For example, when raising the ground-engaging component(s) 304, the control valve 322 may be moved to the raise position 322R (e.g., by adjusting the pressure-based forces applied against the valve spool 336 via the first and second valve actuators 346, 348). Specifically, at the raise position 322R, hydraulic fluid supplied to the control valve 322 from the pump 314 may be output from the control valve 322 via the first output port 324 and directed through the first fluid line 310 to the first chamber 306 of each cylinder 302, thereby allowing the ground-engaging component(s) 304 to be raised relative to the ground. In addition, when the control valve 322 is at the raise position 322R, hydraulic fluid contained within the second chamber 308 of each cylinder 302 may be directed back through the control valve 336 from the second fluid line 312 to allow such fluid to be returned via the return line 334.

Similarly, when lowering the ground-engaging component(s) 304, the control valve 322 may be moved to the lower position 322L (e.g., by adjusting the pressure-based forces applied against the valve spool 336 via the first and second valve actuators 346, 348). Specifically, at the lower position 322L, hydraulic fluid supplied to the control valve 322 from the pump 314 may be output from the control valve 322 via the second output port 326 and directed through the second fluid line 312 to the second chamber 308 of each cylinder 302, thereby allowing the ground-engaging component(s) 304 to be lowered relative to the ground. Additionally, when the control valve 322 is at the lower position 322L, hydraulic fluid contained within the first chamber 306 of each cylinder 302 may be directed back through the control valve 322 from the first fluid line 310 to allow such fluid to be returned via the return line 334.

Furthermore, when it is desired to operate the implement 12 in the constant down pressure mode, the operation of the system 300 may be adjusted to allow the fluid pressure of the hydraulic fluid supplied to the second chamber 308 of each cylinder 302 (i.e., the output pressure of the control valve 322) to be maintained at a substantially constant pressure corresponding to an operator-selected pressure setting. Specifically, when in the constant down pressure mode, the shut-off valve 368 may be actuated from its closed position to its open position to allow a portion of the hydraulic fluid flowing through the second fluid line 312 to be directed through the bypass line 366 to the secondary valve actuator 360. In addition, the output pressure for the first pressure control valve 342 may set based on the operator-selected pressure setting and the intensification ratio between the first and secondary valve actuators 346, 360 such that the pressure-based forces applied at the opposed ends 338, 340 of the valve spool 336 are balanced when the fluid pressure of the hydraulic fluid supplied through the second fluid line 312 is equal or substantially equal to the operator-selected pressure setting. For example, assuming that the operator-selected pressure setting corresponds to a fluid pressure within the second fluid line 312 of 1000 pounds-per-square inch (psi) and assuming an intensification ratio of 10:1, the operation of the first pressure control valve 342 may be controlled such that the output pressure of the valve 342 is equal to 100 psi. In such instance, if the fluid pressure within the second fluid line 312 is equal or substantially equal to the operator-selected pressure setting, the pressure-based forces applied at the opposed ends 338, 340 of the valve spool 360 may be balanced or substantially balanced, thereby causing the valve spool to be moved to the neutral position 322N. However, if the fluid pressure within the second fluid line 312 is less than the operator-selected pressure setting (e.g., by a given pressure differential threshold), the pressure-based force being applied at the first end 338 of the valve spool 336 by the first valve actuator 346 may exceed the pressure-based force being applied at the second end 340 of the valve spool 336 by the secondary valve actuator 360. Such an imbalance in the forces applied against the valve spool 336 may result in the spool 336 being temporarily shifted from the neutral position 322N to the raise position 322R to allow the pressure within the second fluid line 312 to be increased back up to the operator-selected pressure setting, at which point the valve spool 336 may shift back to the neutral position 322A. Similarly, if the fluid pressure within the second fluid line 312 is greater than the operator-selected pressure setting (e.g., by a given pressure differential threshold), the pressure-based force being applied at the first end 338 of the valve spool 336 by the first valve actuator 346 may be less than the pressure-based force being applied at the second end 338 of the valve spool 336 by the secondary valve actuator 360. As a result of the imbalanced forces, the valve spool 336 may be temporarily shifted from the neutral position 322N towards the lower position 322L to allow the pressure within the second fluid line 312 to be reduced back down to the operator-selected pressure setting, at which point the valve spool 336 may shift back to the neutral position 322N. Accordingly, the output pressure of the control valve 322 may be self-correcting to allow hydraulic fluid to be supplied to the second chamber 308 of each cylinder 302 at a substantially constant pressure generally corresponding to the operator-selected pressure setting.

It should be appreciated that, to enhance the functionality of the disclosed valve configuration, the valve spool 336 may be designed to have little or no deadband between its neutral position 322N and its raise/lower positions 322R, 322L. As such, even with relatively minor reductions or increases in the fluid pressure of the hydraulic fluid supplied through the second fluid line 312, the valve spool 336 may be temporarily actuated to the raise position 322R or the lower position 322L, respectively, to allow the output pressure of the control valve 322 to be adjusted accordingly.

It should also be appreciated that the pressure of the hydraulic fluid supplied through the second fluid line 312 may be considered to be substantially equal to the desired fluid pressure when the pressure differential between the fluid pressure within the second fluid line 312 and the desired fluid pressure is less than 10%, such as less than about 5% or less than about 2% or less than about 1%. One of ordinary skill in the art should appreciate that the specific value for such pressure differential may vary depending on the deadband provided on the valve spool 336 between its neutral position 322N and its raise/lower positions 322R, 322L. For instance, as the amount of deadband is reduced, the pressure differential required for the valve spool 336 to temporarily shift from the neutral position 322N to the raise position 322R or the lower position 322L may be similarly reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling the supply of hydraulic fluid to an implement of a work vehicle, the implement including a hydraulic cylinder having a first chamber and a second chamber, the system comprising:
    a pump configured to provide hydraulic fluid under pressure through a pump output line;
    a control valve in flow communication with the pump, the control valve being configured to regulate a supply of hydraulic fluid to the hydraulic cylinder;
    a first fluid line provided in flow communication with a first output port of the control valve, the control valve being configured to supply hydraulic fluid through the first fluid line to the first chamber of the hydraulic cylinder for raising at least one ground-engaging component of the implement relative to the ground;
    a second fluid line provided in flow communication with a second output port of the control valve, the control valve being configured to supply hydraulic fluid through the second fluid line to the second chamber of the hydraulic cylinder for lowering the at least one ground-engaging component relative to the ground;
    a pressure control valve fluidly coupled to the pump output line, the pressure control valve being configured to regulate a fluid pressure of the hydraulic fluid being supplied to the control valve such that the hydraulic fluid is supplied to the control valve at a first pressure for raising the at least one ground-engaging component and a second pressure for lowering the at least one ground-engaging component; and
    a bypass line configured to be in fluid communication with the pressure control valve, wherein a portion of the hydraulic fluid supplied through the system is diverted through the bypass line so as to actuate the pressure control valve in a manner that adjusts the fluid pressure of the hydraulic fluid supplied to the control valve between the first and second pressures.

2. The system of claim 1, wherein the pressure control valve includes a valve spool configured to be actuated to regulate the fluid pressure of the hydraulic fluid being supplied to the control valve, the bypass line being in flow communication with the pressure control valve such that the portion of the hydraulic fluid diverted through the bypass line is used to apply a pressure-based force against the valve spool that actuates the spool to adjust the fluid pressure between the first and second pressures.

3. The system of claim 1, wherein the bypass line is fluidly coupled to the pump output line upstream of the pressure control valve, further comprising a secondary pressure control valve in flow communication with the bypass line, the secondary pressure control valve being configured to regulate a pressure of the hydraulic fluid being diverted through the bypass line to the pressure control valve.

4. The system of claim 3, wherein the secondary pressure control valve is configured to regulate the pressure of the hydraulic fluid being diverted through the bypass line to control the actuation of the pressure control valve in a manner that adjusts the fluid pressure of the hydraulic fluid supplied to the control valve between the first and second pressures.

5. The system of claim 3, wherein the bypass line corresponds to a first bypass line and further comprising a second bypass line fluidly coupled to the first fluid line at a location downstream of the control valve, the first and second bypass lines being configured to be selectively provided in flow communication with the pressure control valve.

6. The system of claim 5, further comprising a shuttle valve coupled between the first and second bypass lines, the shuttle valve being in flow communication with a pilot line to the pressure control valve, the shuttle valve configured to selectively couple a respective one of the first and second bypass lines to the input line.

7. The system of claim 6, wherein, when the hydraulic fluid is being supplied from the control valve through the second fluid line for lowering the at least one ground-engaging component, the shuttle valve is configured to fluidly couple the first bypass line to the input line such that the pressure control valve is actuated to a valve position for supplying the hydraulic fluid at the second pressure.

8. The system of claim 6, wherein, when the hydraulic fluid is being supplied from the control valve through the first fluid line for raising the at least one ground-engaging component, the shuttle valve is configured to fluidly couple the second bypass line to the input line such that the pressure control valve is actuated to a valve position for supplying the hydraulic fluid at the first pressure.

9. The system of claim 1, wherein the first pressure is greater than the second pressure.

* * * * *